United States Patent [19] [11] 3,880,065
Stickle [45] Apr. 29, 1975

[54] TORTILLA CENTERING DEVICE

[76] Inventor: Daniel T. Stickle, 5410 Avenue T, Lubbock, Tex. 79412

[22] Filed: Feb. 21, 1974

[21] Appl. No.: 444,334

[52] U.S. Cl.................... 99/353; 99/404; 99/443 C
[51] Int. Cl.......................... A21b 5/08; A47j 37/12
[58] Field of Search............................ 99/352–353, 99/354–355, 356, 404–405, 406–407, 408, 427, 431–432, 439, 443; 198/29, 34

[56] References Cited
UNITED STATES PATENTS

| | | | |
|---|---|---|---|
| 2,700,939 | 2/1955 | Liston | 99/353 UX |
| 3,267,836 | 8/1966 | Yepis | 99/404 |
| 3,323,633 | 6/1967 | Engel et al. | 198/34 |
| 3,602,130 | 8/1971 | Perez | 99/404 |
| 3,635,638 | 1/1972 | Bryan | 198/34 X |
| 3,763,764 | 10/1973 | Schy | 99/353 |
| 3,766,846 | 10/1973 | Jimenez | 99/353 |
| 3,785,273 | 1/1974 | Stickle | 99/404 |
| 3,795,303 | 3/1974 | Taggert et al. | 198/34 |

Primary Examiner—Billy J. Wilhite
Assistant Examiner—Arthur O. Henderson
Attorney, Agent, or Firm—Christie, Parker & Hale

[57] ABSTRACT

A tortilla is placed on a flexible belt which carries a pivotable plunger adapted to move from an upright position above the belt down to a lower position in which the plunger clamps the tortilla on the belt. The belt is moved to a centering station where a resilient obstruction engages the forward edge of the tortilla and moves it relative to the plunger when the belt, tortilla and plunger are momentarily lifted by a plate sweeping under the belt so the tortilla is centered under the plunger when the plunger is in the lower position. As the belt is further advanced, it wraps the tortilla around the plunger into the folded shape of a taco shell, which is then fried crisp in the folded position. Thereafter, the belt is unwrapped from around the taco shell and plunger, and the shell is removed from the plunger.

5 Claims, 7 Drawing Figures

3,880,065

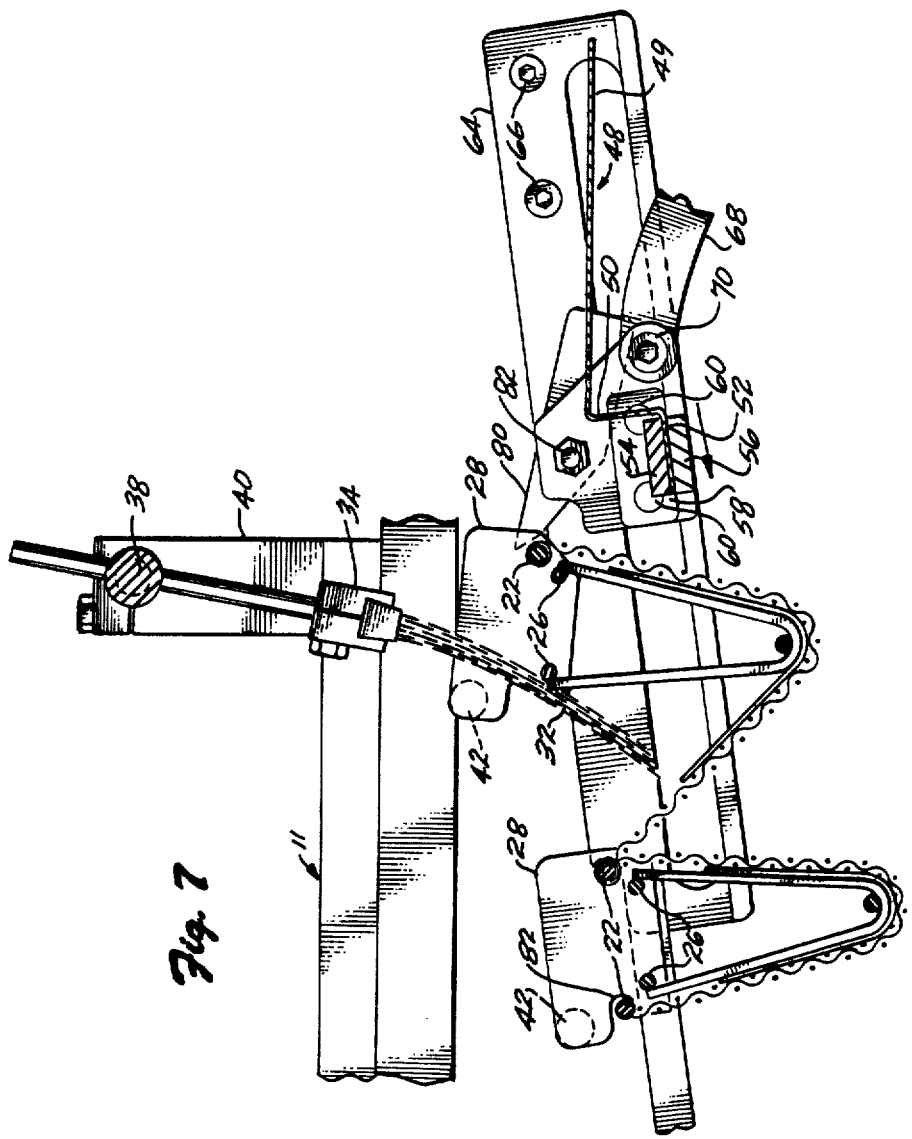

TORTILLA CENTERING DEVICE

BACKGROUND OF THE INVENTION

A popular Mexican food is the taco, which is made by folding and frying a tortilla in a "U-shaped" configuration. The product is a crisp taco shell which is then filled with meat, cheese, vegetables, sauces, etc., according to taste and the availability of ingredients. This invention relates to apparatus for forming and cooking taco shells.

DESCRIPTION OF THE PRIOR ART

My U.S. Pat. No. 3,785,273 discloses an improved machine which efficiently makes taco shells of high quality. In that machine, tortillas are placed on a flexible endless belt which is advanced intermittently from a loading station, through a vat of hot cooking oil, and past a discharge station where the cooked taco shells are removed. The belt is substantially horizontal at the loading station where the tortilla is placed on it. As the belt is advanced toward the vat of cooking oil, it starts on a downwardly sloping path, and a pivotable plunger carried by the belt pivots from an upright position above the belt down into contact with the tortilla to clamp the tortilla in a cooking position on the belt. Due to the downward slope of the belt, the tortilla sometimes works its way forward of its desired position so that it is not centralized with respect to the plunger when the plunger engages it. The result is a misshapen taco shell which may have a "J" shape instead of the desired "U" shape.

SUMMARY OF THE INVENTION

This invention provides a tortilla centering device for the taco shell cooking machine described in my U.S. Pat. No. 3,785,273. The centering device of this invention eliminates misshapen or J-shaped taco shells.

Briefly, this invention provides apparatus for centering a tortilla in a cooking position on a conveyor. The apparatus includes a flexible belt arranged to present an upwardly facing surface to receive a tortilla. A plunger is secured to the belt to be pivotable from an upright to a lower position in which the plunger clamps the tortilla on the belt. Means are provided for moving the belt to advance the tortilla, and means are provided for moving the plunger from the upright to the lower position. A resilient obstruction is mounted over the belt at a centering station, and is in the path of the tortilla as the belt moves so the obstruction engages the forward edge of the tortilla and moves it relative to the belt and plunger to center the tortilla under the plunger when the plunger is in the lower position.

Preferably, the resilient obstruction is a brush mounted to pivot about a horizontal transverse axis over the belt. The brush includes downwardly extending bristles which rest against the belt at the centering station to engage the forward edge of the tortilla. Preferably, a support plate is disposed under the flexible belt at the centering station to support the belt in a substantially horizontal configuration, and to damp out oscillations in the belt as it is moved past the centering station. Means are also provided for sliding the support plate under the belt in contact with it to lift momentarily the belt, tortilla, and plunger to permit the resilient obstruction or brush to urge the tortilla toward a centralized position under the plunger.

These and other aspects of the invention will be more fully understood from the following detailed description and from the accompanying drawings.

BRIEF DESCRIPTION OF THE DRAWINGS

FIG. 7 is a sectional elevation of the invention with the support plate moving forward.

DESCRIPTION OF THE PREFERRED EMBODIMENT

Figure 1:
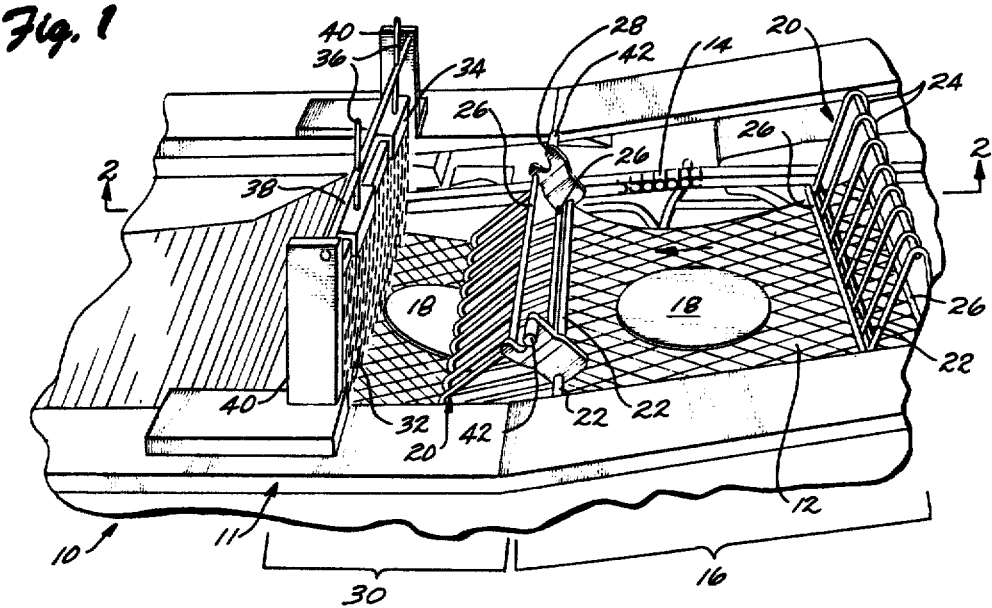
FIG. 1 is a fragmentary perspective view of the centering device mounted on a taco shell cooking machine.

A portion of a taco shell cooking machine 10, such as that shown in my U.S. Pat. No. 3,785,273, is shown in FIG. 1. It includes a support frame 11, and an endless flexible belt 12 secured at its opposite edges at longitudinally spaced points to a pair of endless drive chains 14 (only one of which is shown in FIG. 1), which are advanced intermittently as described in my U.S. Pat. No. 3,785,273 and below.

The portion of the taco shell cooking machine shown in FIG. 1 includes a loading station 16 where a tortilla 18 is placed on a substantially horizontal portion of the belt. A plurality of longitudinally spaced plungers or male molds 20 are each secured to a horizontal transverse pivot rod 22. The end of each pivot rod is secured to a respective one of the drive chains where the flexible belt is also attached to the chain. Each plunger is made up of a plurality of V-shaped wire loops 24 each secured at its respective ends to a transverse and horizontal header bar 26. The adjacent ends of the header bars are each connected to a respective cam plate 28, each located outboard of the belt. The cam plates are pivotally carried by the pivot rod so that each male plunger can pivot in a counterclockwise direction (as viewed in the drawings) from an upright position (shown at the right end of FIG. 1) to a lower position in which the plunger rests on the tortilla and clamps it lightly against the flexible belt.

The belt is moved from right to left (as viewed in FIG. 1) so that the tortilla is advanced from a loading station to a centering station 30 where the forward edge of a tortilla engages downwardly extending bristles 32 secured at their upper ends to a transverse horizontal grip 34 mounted by vertical handles 36 to pivot about a horizontal transverse shaft 38 supported by a pair of upright columns 40 located on the machine frame on opposite sides of the belt. As explained in more detail below, the brush limits the forward travel of the tortilla on the belt relative to the respective plunger engaging the tortilla so that the tortilla is centered with respect to the plunger when the plunger is in the lower position.

Figure 2:
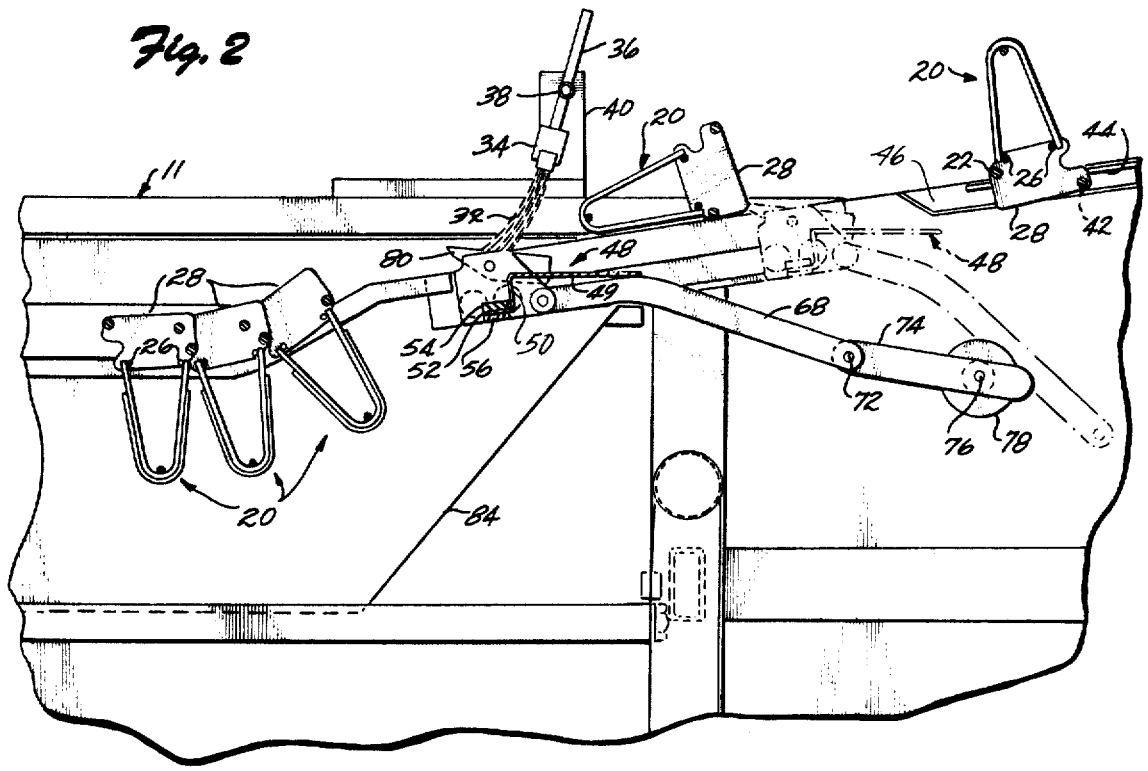
FIG. 2 is a sectional view taken on line 2—2 of FIG. 1 with some parts omitted for clarity.

Each cam plate carries a respective outwardly extending cam roller 42 which rides in a respective longitudinal guide rail 44 (only one of which is shown in FIG. 2) mounted on the cooking machine frame. Each guide rail extends downwardly toward the loading station and has an opening 46 just ahead of the loading station so that as the drive chain and belt are moved forward, the cam roller 42 reaches opening 46, which permits the plunger to fall and pivot about the pivot rod 22 in a counterclockwise (as viewed in the drawings) direction toward the lower position where the plunger will rest on the tortilla.

As shown best in FIGS. 2-7, a transverse support plate 48 is disposed under the belt to reciprocate longitudinally between the centering station and the loading station. The support plate is almost as wide as the belt, and its length is about equal to the diameter of the tortilla. The support plate 48 includes a substantially horizontal support section 49 formed integrally at its forward end with the upper edge of a vertical section 50, which is formed integrally at its lower edge with a forwardly and horizontally extending tongue 52 clamped between an upper bar 54 and a lower bar 56. The bars extend transversely and horizontally under the belt and are each secured at their adjacent ends to a respective carrier plate 58, which includes a pair of outwardly extending rollers 60 mounted to roll about respective transverse and horizontal axes in a longitudinally extending slot 62 in a respective guide plate 64 secured by bolts 66 to a respective side of the machine frame. The forward end of a longitudinally extending connecting rod 68 is secured by a transverse pivot pin 70 to the carrier plate 58. The rear end of the connecting rod is secured by a pivot pin 72 to the outer end of a crank arm 74 secured to a horizontal and transversely extending shaft 76 of an electric motor 78, which rotates and causes the support plate to reciprocate between the solid and phantom line positions shown in FIG. 2.

A separate dog 80 is secured by a respective horizontal and transverse pivot bolt 82 forward of its center of gravity to each carrier plate 58. Gravity causes the dog to tend to rotate about pivot bolt 82 in a clockwise (as viewed in the drawings) direction. It is held in the position shown in FIGS. 3, 4, 6 and 7 by its lower rear portion resting on the outer end of connecting pin 70 at the forward end of the connecting rod 68.

Figure 3:
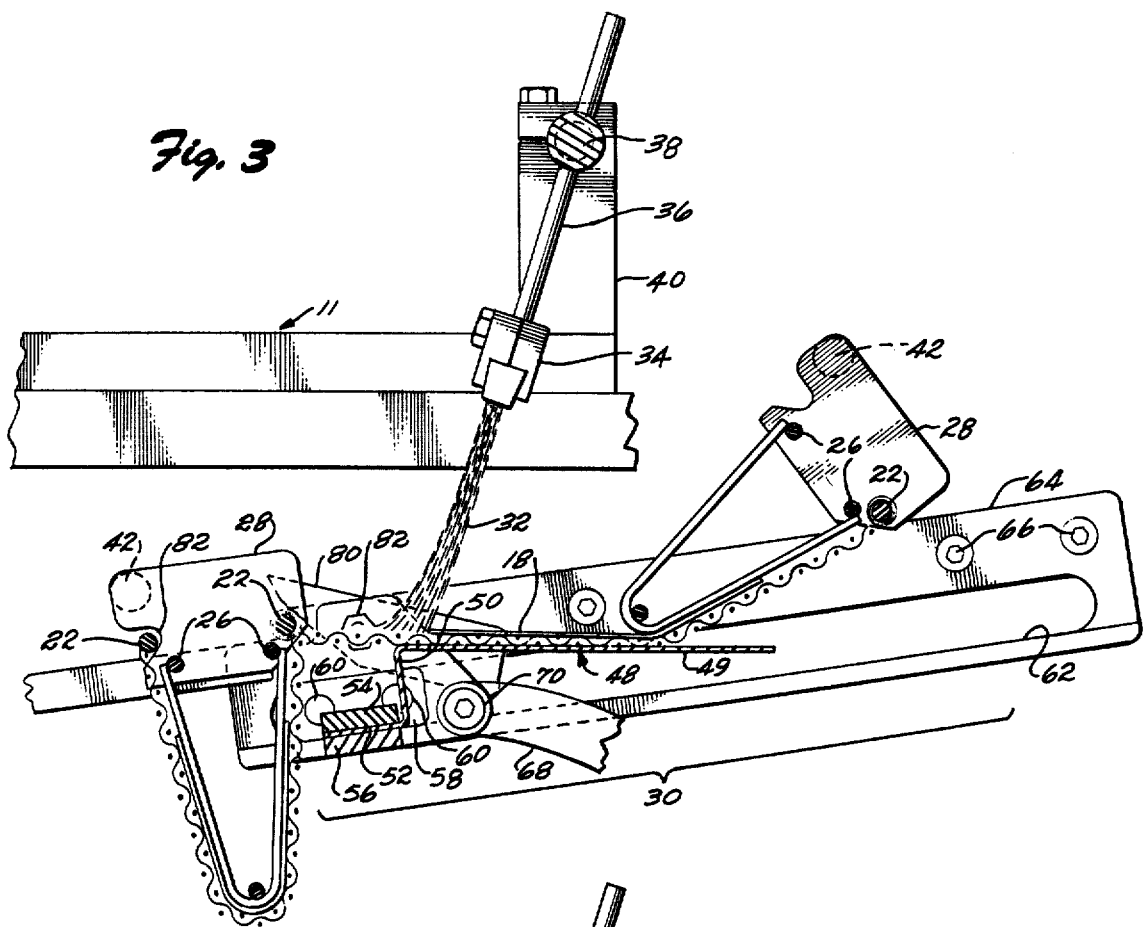
FIG. 3 is an enlarged sectional elevation of the invention with the support plate in its most forward position.

As shown best in FIG. 3, when the support plate is in its most forward position, it supports the flexible belt at the centering station in a substantially horizontal position. The lower end of the brush bristles rest on the top surface of the belt and extend upwardly and rearwardly, with the brush support post 36 also being inclined upwardly and rearwardly. If the tortilla is too far forward (as shown in FIG. 3), the brush bristles contact the forward edge of the tortilla and the surface of the belt ahead of the point where the bristles would normally contact the belt if the tortilla were in a centered position under the plunger, or if no tortilla were on the belt.

Figure 4:
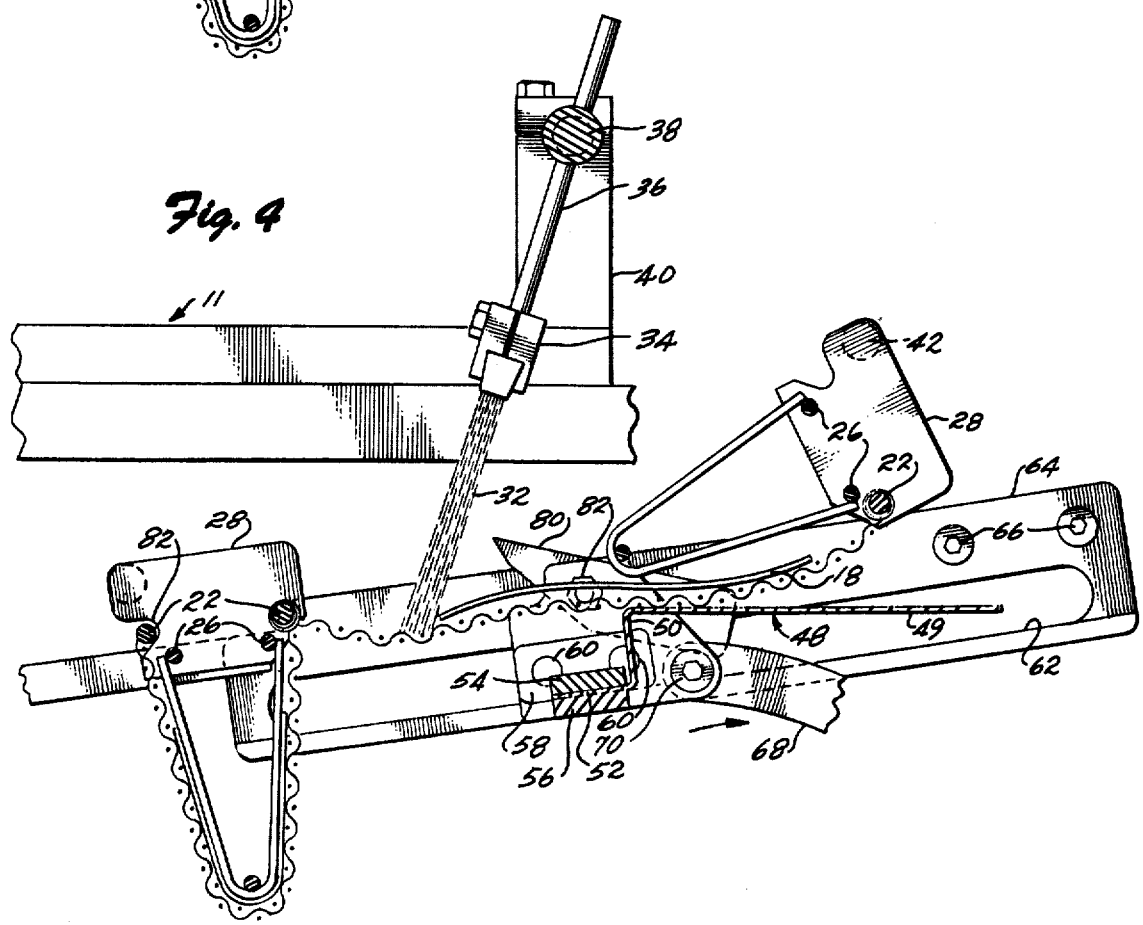
FIG. 4 is a sectional elevation of the invention with the support plate moving rearwardly.
Figure 5:
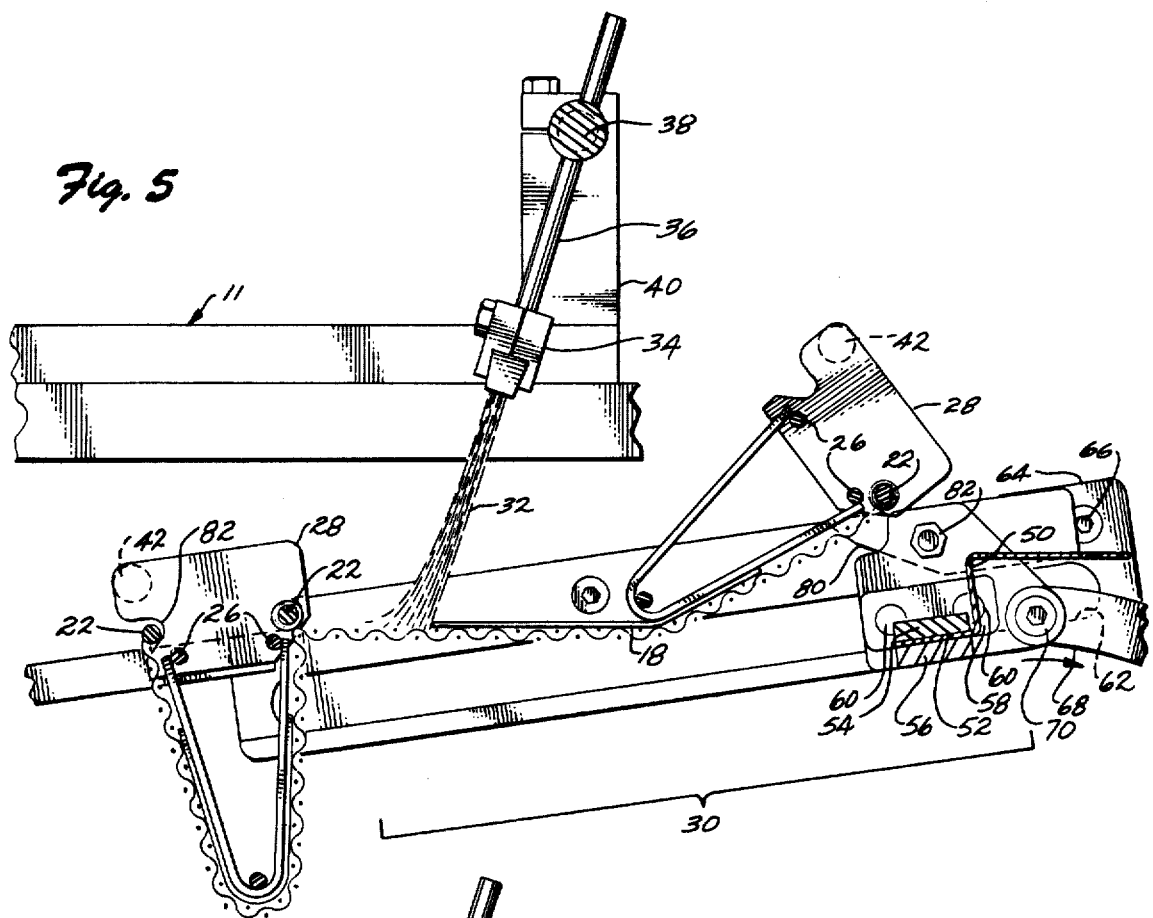
FIG. 5 is a sectional elevation of the invention with the support plate near the rear end of its travel.
Figure 6:
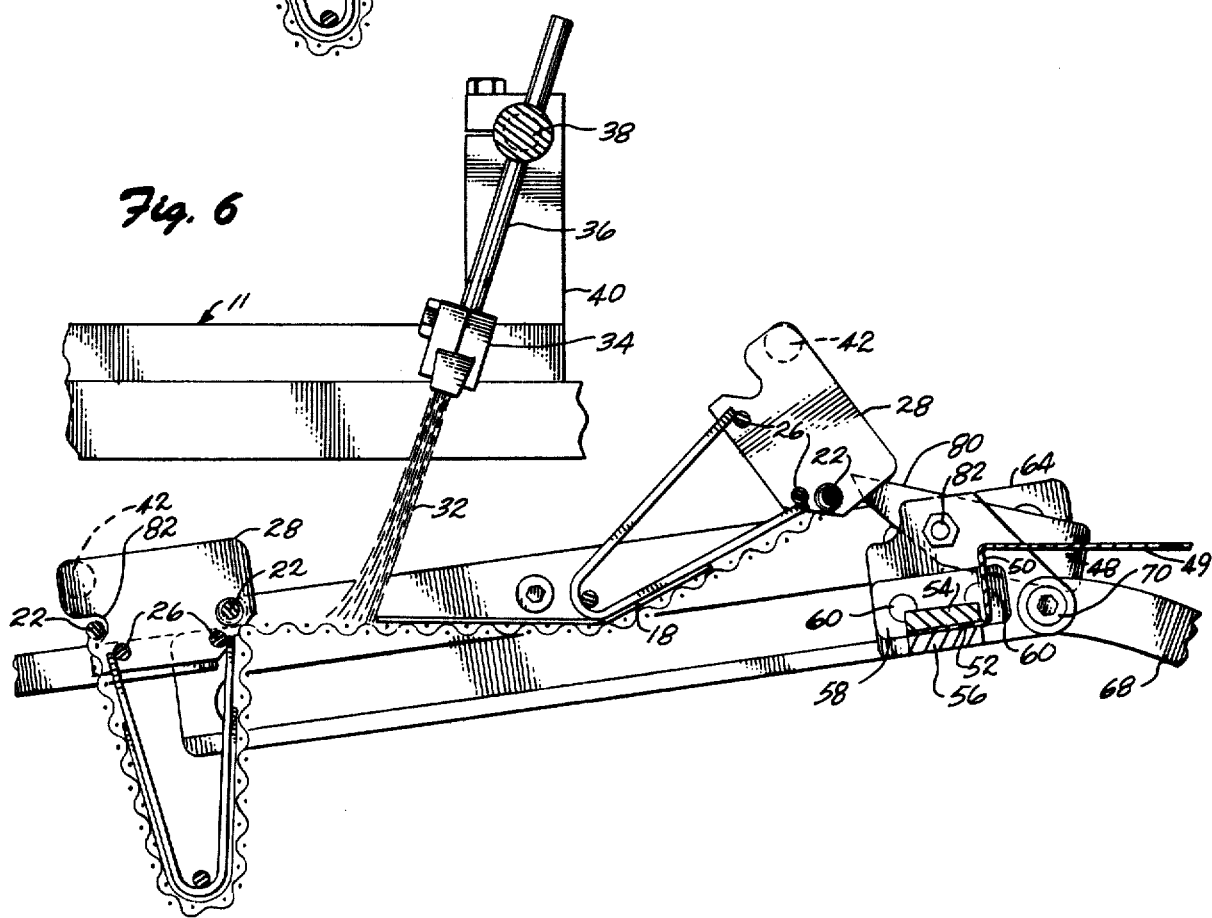
FIG. 6 is a sectional elevation of the invention with the support plate at the rear limit of its travel.

The centering device operates as follows. The tortilla is placed on the upper surface of the belt at the loading station. As the belt advances, as described in my U.S. Pat. No. 3,785,273, the tortilla tends to work its way forward in the space between adjacent plungers, particularly as the belt starts on its downward slope shown in FIG. 3 where the plunger engages the tortilla somewhat to the rear of the center of the tortilla. Consequently, the brush bristles 32 are urged forward of where they would normally come to rest. The plate is moved rearwardly as indicated in FIG. 4 by the action of the connecting rod and crank arm driven by the electric motor. As the support plate moves rearwardly, it sweeps under the belt with a rippling action which momentarily lifts the belt, tortilla, and plunger so that the tortilla is now free to be swept gently to the rear relative to the plunger and the belt so that the tortilla is moved to the centered position shown in FIG. 5 as the plate continues its movement to the rearward limit of its travel. As shown in FIG. 5, the upper end of dog 80 is depressed as it passes under the pivot rod 22 which carries the plunger resting on the tortilla at the centering station. As the plate continues its travel to the rear end of its stroke, the forward end of dog 80 clears the pivot rod 22 and moves up to the position shown in FIG. 6. As the plate start to move forward, the dog engages the pivot rod of the plunger and forces it forward to the position shown in FIG. 7 so that the flexible belt is depressed to wrap itself and the tortilla around the plunger in a V-shaped configuration. The brush is lifted up and pivoted in a clockwise (as viewed in FIG. 7) direction to permit the plunger to pass underneath. The forward movement of the plate continues to carry the dog and plunger forward to the final position shown in FIG. 3. The forward edge (when the plunger is in the inverted or lower position) of the cam plate includes a notch 82 which engages the pivot rod of the preceding plunger, the cam plates on each plunger being offset so they will nest as they are pushed forward through a cooking vat 84 as shown in FIG. 2.

Thus, as the plate reciprocates back and forth under the belt at the centering and loading stations, the plungers are advanced stepwise in exact synchronism with the removal of the plungers, drive chain, and belt from the discharge end (not shown) of the cooking vat as described in my U.S. Pat. No. 3,785,273.

The advantages of the centering device of this invention are that the support plate under the belt in the centering station damps out belt oscillations, thus minimizing the tendency of the tortilla to work its way forward out of a centralized position. The same tendency is also inhibited by the horizontal support given by the plate to the belt in the centering station. The brush presents a resilient obstruction which inhibits the tendency of the tortillas to work their way forward of a central position under the respective plunger which engages them. Moreover, the brush urges each tortilla into a centralized position as the plate is retracted under the belt.

I claim:

1. Apparatus for centering a tortilla in a cooking position on a conveyor, the apparatus including:
   a. a flexible belt arranged to present an upwardly facing surface to receive a tortilla;
   b. a plunger secured to the belt to be pivotable from an upright to a lower position in which the plunger clamps the tortilla on the belt;
   c. means for moving the belt to advance the tortilla;
   d. means for moving the plunger from the upright to the lower position; and
   e. a resilient obstruction mounted over the belt at a centering station and in the path of the tortilla as the belt moves so the obstruction engages the forward edge of the tortilla and moves it relative to the belt and plunger to center the tortilla under the plunger when the plunger is moved to the lower position.

2. Apparatus according to claim 1 in which the resilient obstruction is a brush mounted over the belt.

3. Apparatus according to claim 2 which includes means for securing the brush over the belt to pivot about a substantially horizontal and transverse axis.

4. Apparatus according to claim 1 which includes a support plate mounted under the belt at the centering station.

5. Apparatus according to claim 4 which includes means for sliding the plate under the belt and in contact with the belt to lift momentarily the belt, tortilla, and plunger to permit the resilient obstruction to urge the tortilla toward a centralized position under the plunger.

* * * * *